United States Patent [19]

Hagen

[11] Patent Number: 5,401,781
[45] Date of Patent: Mar. 28, 1995

[54] PROCESS FOR FORMING A CURED ARTICLE OF CONSISTENT SHAPE FROM AN EXTRUDED HYDROLYZABLE SILOXANE COMPOSITION

[75] Inventor: Peter R. Hagen, Harbor Springs, Mich.

[73] Assignee: Dow Corning Corporation, Midland, Mich.

[21] Appl. No.: 184,421

[22] Filed: Jan. 21, 1994

[51] Int. Cl.$^6$ .............................................. C08K 9/06
[52] U.S. Cl. .................................... 523/213; 523/212; 264/178 R; 264/183; 264/236; 264/247
[58] Field of Search .................... 264/178 R, 183, 236, 264/247; 523/212, 213

[56] References Cited

U.S. PATENT DOCUMENTS

| | | | |
|---|---|---|---|
| 3,184,427 | 5/1965 | Russell et al. | 260/37 |
| 3,849,462 | 11/1974 | Lengnick | 260/448.2 |
| 4,075,154 | 2/1978 | Itoh et al. | 260/37 |
| 4,683,251 | 7/1987 | Mikami | 522/46 |
| 4,783,289 | 11/1988 | Shimizu et al. | 264/28 |

FOREIGN PATENT DOCUMENTS

| | | |
|---|---|---|
| 0324411 | 7/1989 | European Pat. Off. |
| 63-010663 | 1/1988 | Japan |

OTHER PUBLICATIONS

EP 409079 Abstract only, publication date: Jan. 23, 1991.
The Handbook of Silicone Rubber Fabrication, W. Lunch, van Nostrand Reinhold Co. New York, N.Y. (1978).
Fabricating with Silastic® brand rubber, Bulletin 17-053a of Dow Corning Corporation (9–73).

*Primary Examiner*—Melvyn I. Marquis
*Attorney, Agent, or Firm*—William F. Boley

[57] ABSTRACT

A process for forming a cured article of consistent shape from a hydrolyzable siloxane composition without the problem of non-uniformity that results from significant die swell upon extrusion and from shrinkage upon curing. The present process comprises extruding a non-self-supporting composition maintained at a temperature greater than 5° C. The composition comprises a polydiorganosiloxane having at least two silicon-bonded hydrolyzable groups per molecule, a hydrolyzable silicon crosslinker, a filler, and optionally a curing catalyst. The composition is extruded at a constant rate through a shaping die to form a shaped extrusion having a cross-sectional area that is substantially uniform throughout the length of the shaped extrusion. The shaped extrusion is fed in a continuous flow into an aqueous curing bath which is maintained at a temperature of at least 20° C. and which has a density substantially the same as or slightly greater than the density of the shaped extrusion. The shaped extrusion is moved through the aqueous curing bath at a constant rate as the shaped extrusion cures into a cured article having a cross-sectional area that is substantially uniform throughout the length of the cured article.

13 Claims, 1 Drawing Sheet

PROCESS FOR FORMING A CURED ARTICLE OF CONSISTENT SHAPE FROM AN EXTRUDED HYDROLYZABLE SILOXANE COMPOSITION

BACKGROUND OF INVENTION

This invention relates to a process for extruding a liquid or paste viscosity hydrolyzable siloxane composition through a shaping die and curing the shaped extrusion into a cured elastomeric article without distorting the shape.

Siloxane elastomer extrusions have typically been formed from a curable siloxane composition having a firm, self-supporting putty consistency. The curable composition is extruded through a shaping die to form an extrusion having a desired shape. Because the curable siloxane composition has a firm, self-supporting putty consistency, high pressure is required to force the composition through the extruder and shaping die. This makes necessary the use of a rugged extruder and shaping die. Because of the high pressure forcing the composition through the die, the extrusion normally swells upon leaving the die, which is known as die swell. Die swell leads to problems in obtaining exact and consistent dimensions in the cured, shaped extrusion. The high pressure also causes a heat buildup in the extruder which has to be countered during continuous operation with cooling channels in the extruder. After leaving the extruder, the shaped extrusion is heat cured through exposure to steam in a continuous steam vulcanizer or through exposure to hot air in a continuous hot air vulcanizer. The shaped extrusion is supported on a solid surface during heat curing.

Hot liquid vulcanization has been described as a method for curing non-self-supporting silicone rubber extrusions in the *The Handbook of Silicone Rubber Fabrication.* Wilfred Lynch, Van Nostrand Reinhold Company, New York, N.Y., 1978. Shimizu et al., in U.S. Pat. No. 4,783,289, issued Nov. 8, 1988, disclose a process for fabricating an extruded shaped article from a curable liquid silicone rubber composition which is self-supporting or non-self-supporting and which cures by addition-reaction, free-radical initiation or condensation. The disclosed process includes mixing the ingredients of the composition at a temperature of from $-60°$ C. to $5°$ C. and extruding the mixed composition into a water bath having a temperature of at least $25°$ C. in which the mixed composition is submerged. The patent discloses a process employing compositions comprising an alkenyl-containing polydiorganosiloxane and either an organoperoxide or a combination of a polydiorganosiloxane having at least two silicon-bonded hydrogen atoms in each molecule and a platinum-group catalyst. The disclosed compositions include only those which cure by an addition-reaction mechanism or by a free-radical initiation mechanism.

The present process employs a non-self-supporting, hydrolyzable siloxane composition which cures through a condensation reaction upon exposure to moisture. The composition comprises a polydiorganosiloxane having at least two silicon-bonded hydrolyzable groups per molecule, a hydrolyzable silicon crosslinker, a filler, and optionally a curing catalyst, which are mixed together at a temperature greater than $5°$ C., preferably greater than $10°$ C. The process employs a constant extrusion rate which, in combination with the flowability of the composition, allows the composition to be extruded through a shaping die with a much lesser degree of die swell than is encountered with compositions having a self-supporting putty viscosity. This allows production of a shaped extrusion which is substantially uniform when leaving the die and being fed into an aqueous curing bath. In contrast to the addition-reaction and free-radical curing mechanisms disclosed in the Shimizu patent, a condensation curing mechanism can cause shrinkage of the shaped extrusion upon cure as the hydrolyzable groups come off of the polydiorganosiloxane, crosslinker, and filler. This shrinkage can result in non-uniformity of the cured article produced from the shaped extrusion. The process of the present invention allows preparation of a cured article having a substantially uniform cross-sectional area throughout its length despite the shrinkage that inherently results from curing through a condensation reaction.

SUMMARY OF INVENTION

In accordance with the present invention, a cured article of consistent shape can be formed from a hydrolyzable siloxane composition without the problem of non-uniformity that results from significant die swell upon extrusion and from shrinkage upon curing. The process of the present invention comprises extruding a non-self-supporting composition maintained at a temperature greater than $5°$ C. The composition comprises a polydiorganosiloxane having at least two silicon-bonded hydrolyzable groups per molecule, a hydrolyzable silicone crosslinker, a filler, and optionally a curing catalyst. The composition is extruded at a constant rate through a shaping die to form a shaped extrusion having a cross-sectional area that is substantially uniform throughout the length of the shaped extrusion. The shaped extrusion is fed in a continuous flow into an aqueous curing bath which is maintained at a temperature of at least $20°$ C. and which has a density substantially the same as or slightly greater than the density of the shaped extrusion. The shaped extrusion is moved through the aqueous curing bath at a constant rate as the shaped extrusion cures into a cured article having a cross-sectional area that is substantially uniform throughout the length of the cured article.

Figure 1:
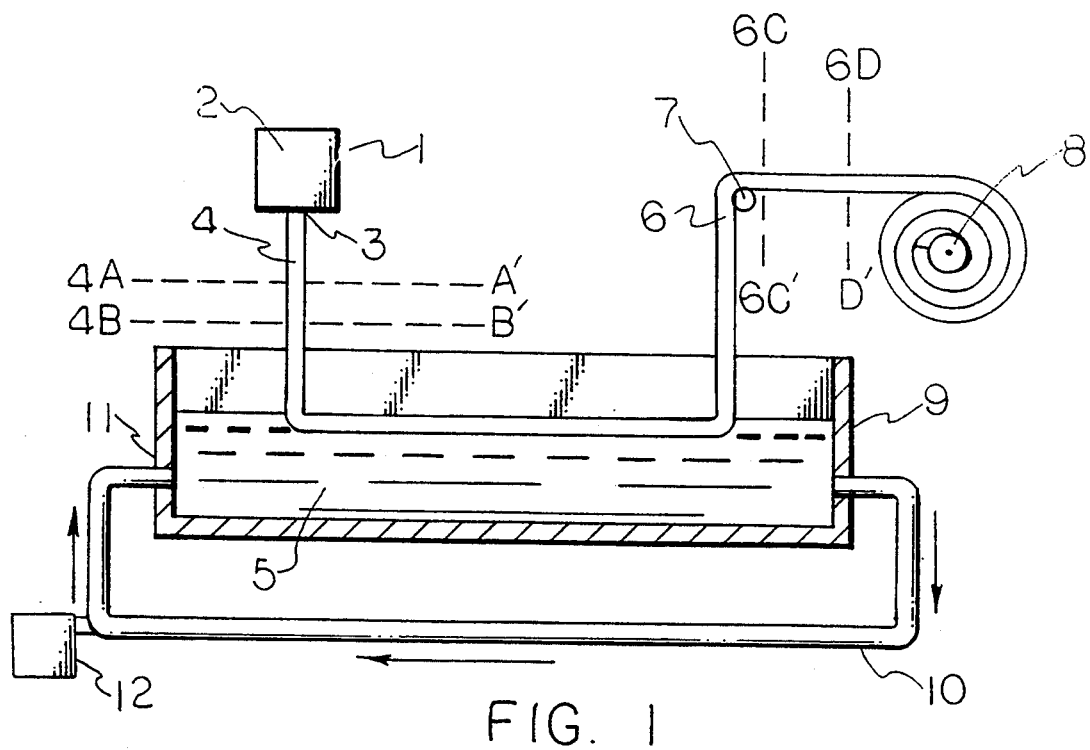
FIG. 1 is a schematic representation of one embodiment of the present method. Vessel 1 represents the apparatus in which composition 2 of the present invention is contained, which is preferably a mixing apparatus. Composition 2 is extruded through shaping die 3 to form shaped extrusion 4 which is fed into aqueous curing bath 5. The extrusion is cured in the aqueous curing bath 5 to form cured article 6 which is removed from aqueous curing bath 5 and passed over guide roll 7 and wound onto hollow core 8. The aqueous curing bath 5 circulates by force of pump 12 through trough 9 and circulating pipe 10 to move the shaped extrusion along the length of the trough.
Figure 2:
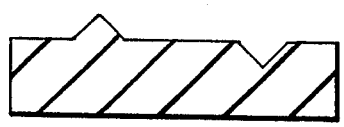
FIG. 2 is a schematic representation of cross-sections 4A to A' and 4B to B' of the shaped extrusion 4, illustrating the substantial uniformity of the cross-sections.
Figure 3:
FIG. 3 is a schematic representation of cross-sections 6C to C' and 6D to D' of the cured article 6, illustrating the substantial uniformity of the cross-sections.

In alternative embodiments, the shaped extrusion 4 can be fed into the aqueous curing bath 5 through a sealed opening 11 in the side of the trough 9. Also, means other than circulation can be employed for moving the shaped extrusion through the aqueous curing bath, which makes pipe 10 and pump 12 unnecessary. For example, the shaped extrusion can be attached to guide roll 7, directly or through a linking object, and a motor can be employed to drive guide roll 7 to pull the shaped extrusion through the aqueous curing bath and to recover the shaped extrusion from the aqueous curing bath. The cured article can also be removed from the aqueous curing bath without passing over the guide roll 7 or being wound onto hollow core 8, as for example, removal by hand.

DETAILED DESCRIPTION OF INVENTION

This invention provides a process for forming a cured article of consistent shape from a hydrolyzable siloxane composition of a liquid or paste viscosity, comprising:
- (A) extruding a non-self-supporting composition which is maintained at a temperature greater than 5° C. and which comprises a polydiorganosiloxane having at least two silicon-bonded hydrolyzable groups per molecule, a hydrolyzable silicone crosslinker, a filler, and optionally a curing catalyst, at a constant rate through a shaping die to form a shaped extrusion having a cross-sectional area that is substantially uniform throughout the length of the shaped extrusion;
- (B) feeding the shaped extrusion in a continuous flow into an aqueous curing bath maintained at a temperature of at least 20° C. and having a density substantially the same as or slightly greater than the density of the shaped extrusion;
- (C) moving the shaped extrusion through the aqueous curing bath as the shaped extrusion cures into a cured article having a cross-sectional area that is substantially uniform throughout the length of the cured article; and
- (D) recovering the cured article from the aqueous curing bath.

The hydrolyzable siloxane compositions of this invention are preferably silicone sealant compositions which comprise a base of polydiorganosiloxane having at least two silicon-bonded hydrolyzable groups per molecule and a filler, a hydrolyzable silicon C. crosslinker, and optionally a curing catalyst.

The polydiorganosiloxane having at least two silicon-bonded hydrolyzable groups per molecule can be described by one of the two general formulas:

and

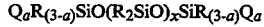

in which Q is a hydrolyzable group, R is a monovalent hydrocarbon radical, a is 1, 2, or 3 and x has an average value such that the viscosity of the polydiorganosiloxane is about 1 to 500 Pa.s at 25° C. The hydrolyzable group, Q, can be any of those which react with water (moisture) and are hydrolyzed. Examples of the hydrolyzable groups include alkoxy, alkenoxy, acyloxy, ketoximo, N-methylbenzamido, and similar groups. Examples of the monovalent hydrocarbon radicals include alkyl, e.g. methyl, ethyl, propyl, butyl, isopropyl, and octyl; alkenyl, e.g. vinyl, allyl, and hexenyl; cycloalkyl, e.g. cyclopentyl and cyclohexyl; aryl, e.g. phenyl, tolyl, and xylyl; and aralkyl, e.g. 2-benzylethyl. The value of x is preferably one which provides a viscosity of about 100 to 500 Pa.s at 25° C. The polydiorganosiloxane having at least two silicon-bonded hydrolyzable groups can be one type of polydiorganosiloxane or a mixture of different types. Polydiorganosiloxanes useful in the present process are commercially available.

The type of polydiorganosiloxane endblocking group depends for the most part upon the type of hydrolyzable groups of the crosslinker.

The hydrolyzable silicone crosslinker has at least three silicon-bonded hydrolyzable groups per molecule, preferably three or four. The hydrolyzable groups include acyloxy groups, e.g. acetoxy, octanoyloxy, and benzoyloxy; ketoximo groups, e.g. dimethylketoximo, methylethylketoximo, and diethylketoximo; alkenyloxy groups such as isopropenyloxy and 1-ethyl-2-methylvinyloxy; amino groups, e.g. dimethylamino, butylamino, diethylamino, and cyclohexylamino; aminoxy groups, e.g. dimethylaminoxy and diethylaminoxy; and amido groups, e.g. N-methylacetamido, N-ethylacetamido, and N-methylbenzamido. The hydrolyzable silicone crosslinker may be a polyalkoxy-silicon crosslinker. Examples of the polyalkoxy-silicon crosslinker include tetraalkyl ortho silicate, e.g. tetraethyl ortho silicate, tetra-n-propyl ortho silicate, tetraisopropyl ortho silicate, and tetrabutyl ortho silicate; alkylpolysilicate, e.g. ethylpolysilicate, n-propylpolysilicate, and butylpolysilicate; and other polyalkoxy-silicon compounds. Hydrolyzable silicon compound crosslinkers useful in the present process are commercially available.

The filler can be a reinforcing filler or an extending filler or a combination of both. The filler can be treated or untreated. Examples of reinforcing fillers include fumed or precipitated silica, silica aerogel, and silica xerogel. A preferred silica treating agent is hexamethyldisilazane. Examples of extending fillers include titanium dioxide, diatomaceous earth, iron oxide, aluminum oxide, zinc oxide, quartz, calcium carbonate, magnesium oxide, carbon black, graphite, glass fibers, glass microspheres, glass microballoons, glass beads, carbon fibers, silicon carbide, polystyrene beads, metal fibers, and the like. A preferred treating agent for calcium carbonate is stearic acid. Fillers and treating agents useful in the present process are commercially available.

The hydrolyzable siloxane composition optionally comprises a curing catalyst to accelerate the condensation-type crosslinking reactions. Examples of curing catalysts include tin catalysts, e.g. dibutyltindilaurate, dibutyltindiacetate, stannous octoate, and stannous 2-ethylhexanoate, and other similar compounds. Examples of the curing catalyst also include other metal salts of carboxylic acid, e.g. metal carboxylates in which the metal atoms may include iron, cobalt, manganese, and zinc; organo titanate and chelated titanates, e.g. tetrabutyl titanate, tetra(isopropyl) titanate, tetra(2-ethylhexyl) titanate, and diisopropoxy-bis-(acetoacetonate) titanium; and the like. Curing catalysts useful in the present process are commercially available.

A preferred hydrolyzable siloxane composition is disclosed in the U.S. patent application of Peter Hagen for High Tear Strength Silicone Compositions, Ser. No. 08/143,429, which was filed Oct. 26, 1993. The preferred composition comprises a hydroxyl-endblocked polydiorganosiloxane, a hexamethyldisilazane treated silica, a stearated calcium carbonate, a polyalkoxy-silicon crosslinker, and a curing catalyst. Among these preferred compositions, the hydroxyl-endblocked polydiorganosiloxane is preferably a hydroxyl-endblocked polydimethylsiloxane, the polyalkoxy-silicon crosslinker is tetra(n-propyl) ortho silicate, and the catalyst is a tin catalyst. The preferred hydrolyzable siloxane compositions are preferably in a two package delivery form wherein one package comprises the polydiorganosiloxane and filler(s) and a second package comprises the polyalkoxy-silicon crosslinker and the catalyst. Two-part delivery helps to prevent premature curing of the composition.

Other additives commonly used in silicone sealants can be used in the hydrolyzable siloxane compositions of the present process, such as colorants, e.g. pigments and dyes; fungicides; solvents; adhesion promoters; anti-oxidants; cure regulators; plasticizers such as silicone fluids, e.g. trimethylsiloxy-endblocked polydimethylsiloxane having a viscosity in the range of about 0.1 to 1 Pa.s at 25° C.; and pacifiers, e.g. low molecular weight silanol polyorganosiloxanes; and the like. Such additives are commercially available.

There is no specific restriction on the ratios of the components of the hydrolyzable siloxane composition. However, the ratio of components should be selected so that the hydrolyzable groups of the polydiorganosiloxane, any incidental moisture which may be present, such as moisture on the filler, and the hydrolyzable groups of the crosslinker are present in ratios that promote cure after the composition is extruded into the aqueous curing bath and during the retention time in the aqueous curing bath. In the preferred composition, the hydrolyzable silicon crosslinker is present in a slight excess to inhibit curing before the shaped extrusion enters the aqueous curing bath, and to promote curing from the outside of the shaped extrusion inward. Similarly, the type and amount of catalyst should be selected to effect cure within the retention time in the aqueous curing bath.

To obtain an extrusion which is uniform in cross-section, it is necessary for the composition to flow through the shaping die at a constant rate. Liquid or paste compositions having a viscosity in a range of about 10 Pa.s to 2,000 Pa.s are operable in the present process. It is also important that the composition that is to be extruded be uniformly mixed and without lumps or chunks such as agglomerates of filler. The components of the composition are preferably mixed together just prior to extruding the composition through the shaping die. The order of mixing of the components depends on the type of components, the type of mixing apparatus, and the apparatus used to feed the components into the mixing apparatus.

The components are mixed together by standard means that provide a homogeneous mixture. The preferred mixing apparatus is an in-line dynamic mixer wherein the components are fed at a constant rate in a non-pulsating manner into one end of the mixer and the mixture is extruded at a constant rate through a shaping die located at the opposite end of the mixer. For extruding, the composition is maintained at a temperature greater than 5° C., preferably in a range of about 10° C. to 25° C.

The mixed composition is extruded through a shaping die which is held by a die holder attached to the outlet of the container which holds the mixed composition. Preferably the composition is extruded through a shaping die held by a die holder attached to the mixing apparatus. The shaping die is a simple plate die of metal or plastic. A complicated or rugged die is not required because the composition is of a liquid or paste viscosity so the pressures necessary for extrusion are relatively low, obviating the need for high strength constructions. The pressures typically employed are in a range of about 100 to 500 psi. Extrusion of the composition through the shaping die forms the shaped extrusion. The shaping die provides the characteristic shape of the shaped extrusion.

The shaped extrusion is fed into an aqueous curing bath. The shaped extrusion is typically fed through the uncovered top of the trough housing the aqueous curing bath, or through a sealed opening in the side of the trough. Feeding is typically effected by simply allowing the shaped extrusion to flow from the extruder into the aqueous curing bath, the extruding pressure is sufficient to force the shaped extrusion into the aqueous curing bath. Preferably, the trough is of sufficient length to provide adequate retention time for the shaped extrusion to cure while in the trough with no interruption in feed to the trough. Retention time will depend on the cure rate of the composition and the length of the bath. The aqueous curing bath has a density substantially the same as or slightly greater than the density of the composition. This allows the shaped extrusion to remain suspended or slight afloat in the aqueous curing bath as the shaped extrusion moves down the length of the bath. The density may be adjusted by addition of a salt, preferably sodium chloride, to the aqueous curing bath.

The shaped extrusion is moved through the aqueous curing bath by any suitable means. It is preferred that the shaped extrusion be pulled through the aqueous curing bath by a motor-driven guide roll or pulley which is located at the end of the trough opposite the end of the trough into which the extrusion is fed. In the most preferred embodiment, the end of the shaped extrusion which first enters the aqueous curing bath is attached to a first end of an object which is attached at its second end to the motor-driven guide roll, the object being of like shape, dimension, and density to the shaped extrusion and lying flat in the aqueous curing bath. The shaped extrusion is pulled at a rate substantially equal to the rate at which the composition is extruded. The rate must be such that it does not significantly ripple the aqueous curing bath. In an alternative embodiment, the shaped extrusion can be moved by circulation of the aqueous curing bath. The aqueous curing bath is circulated by suitable means down the length of the trough from the end of the trough near the point at which the extrusion is fed into the aqueous curing bath to the opposite end. Circulation can be done by pumping the aqueous curing bath into the end of the trough near the point at which the extrusion is fed into the aqueous curing bath and drawing the aqueous curing bath out of the trough at the opposite end. The circulation rate is slightly higher than the rate at which the composition is extruded to allow the aqueous curing bath to transport the shaped extrusion down the length of the trough with little stress being applied to the shaped extrusion while curing.

The aqueous curing bath is maintained at a temperature of at least 20° C. A temperature greater than 50° C. is preferred. The aqueous curing bath can even be maintained at boiling temperatures. The temperature of the aqueous curing bath can be maintained using standard means, such as heat lamps.

The cured article is removed from the aqueous curing bath by standard means, such as pulling the extrusion from the aqueous bath. It is helpful to employ a guide roll as a support and as a pulling means while removing the cured article. A hollow core provides an excellent means for storing the cured article.

The process of the present invention allows the formation of a shaped extrusion which has a complicated or delicate shape from a composition which has a liquid or paste viscosity and which could not support itself or maintain its shape after extrusion without external support. The aqueous curing bath acts as a support for the shaped extrusion and allows the shaped extrusion to maintain its shape until the shaped extrusion has cured sufficiently to become a self-supporting, cured article. Therefore, the process allows production of even thin film extrusions that do not collapse during cure. The nature of the cured article is determined by the composition, as is well understood by those of ordinary skill in the art. The composition comprises those polydiorganosiloxanes, fillers, crosslinkers and catalysts which result in the desired characteristics of the final shaped, cured article. The durometer, tensile strength, elongation, and such are all determined by the selection of the components used in the composition. The simplicity of the process makes it economically feasible to form extruded shaped articles in complicated or delicate patterns and in short or long sections, since the cost of die manufacture and extruding equipment is relatively low.

The following example illustrates the process of the present invention. It should not be construed as limiting the claims which follow. Example 1. A hydrolyzable siloxane composition was prepared for extrusion from a two part silicone sealant composition. The first part of the two part sealant composition was prepared by adding to a change can mixer 20.2 parts of hydroxyl-endblocked polydimethylsiloxane having a viscosity of 350 Pa.s, 20.2 parts of hydroxyl-endblocked polydimethylsiloxane having a viscosity of 150 Pa.s, 18.9 parts of trimethylsiloxy-endblocked polydimethylsiloxane having a viscosity of 0.1 Pa.s, and 0.2 part of hydroxyl-endblocked polydimethylsiloxane having a silicon-bonded hydroxyl content of about 4.0 weight percent. The polymers were mixed to homogeneity. Then the following were added to the mixed polymers: 10.1 parts of precipitated silica filler, having a surface treated with hexamethyldisilazane and an average particle size of about 0.3 micrometers and a surface area of about 125 $m^2/g$, 27 parts of Winnofil SPM which was a precipitated calcium carbonate treated with stearic acid having a surface area of about 22 $m^2/g$, and 3.4 parts of ground calcium carbonate having an average particle size of 2-3 micrometers. The polymer and filler combination was mixed until the filler was thoroughly dispersed.

The second part of the two part silicone sealant composition was prepared by mixing to homogeneity under conditions to exclude moisture, 40 parts of tetra(n-propyl) ortho silicate, 40.5 parts of trimethylsiloxy terminated polydimethylsiloxane having a viscosity of 1 Pa.s, 4.5 parts of fumed silica filler, 8 parts of dibutyltin diacetate, 1 part of glacial acetic acid as a cure regulator, and 6 parts of mineral spirits.

The hydrolyzable siloxane composition was prepared by mixing 94 parts of the first part of the two part silicone sealant composition and six parts of the second part of the two part silicone sealant composition. The hydrolyzable siloxane composition was mixed and then extruded at a constant rate through a shaping die to form a shaped extrusion. The shaped extrusion was fed into an aqueous curing bath having a density of about 1.15 $g/cm^3$ and being maintained at a temperature in a range of about 70–80° C. The extrusion just floated at the bath surface. The extrusion was pulled at a constant rate along the length of the trough by attaching the end of the extrusion that first enters the aqueous curing bath to an item of shape and dimension similar to the extrusion which was lying flat at the surface of the bath and was attached to a motor driven guide roll at the opposite end of the trough. The extrusion cured as it was pulled along the bath, the humidity at the bath surface being sufficiently high so the area of the extrusion that was not submerged in the bath also cured at the same rate as that submerged in the bath. After about 3.5 minutes retention time in the aqueous curing bath, the cured article was recovered from the aqueous curing bath by the pulling action of the guide roll. The cured article was observed to have a thick, deep cure. The cured article maintained the extruded shape without distortion.

That which is claimed is:

1. A process for forming a cured article of consistent shape from a hydrolyzable siloxane composition of a liquid or paste viscosity, comprising:
   (A) extruding a non-self-supporting composition which is maintained at a temperature greater than 5° C. and which comprises a polydiorganosiloxane having at least two silicon-bonded hydrolyzable groups per molecule, a hydrolyzable silicon crosslinker, a filler, and optionally a curing catalyst, at a constant rate through a shaping die to form a shaped extrusion having a cross-sectional area that is substantially uniform throughout the length of the shaped extrusion;
   (B) feeding the shaped extrusion in a continuous flow into an aqueous curing bath maintained at a temperature of at least 20° C. and having a density substantially the same as or slightly greater than the density of the shaped extrusion;
   (C) moving the shaped extrusion through the aqueous curing bath as the shaped extrusion cures into a cured article having a cross-sectional area that is substantially uniform throughout the length of the cured article; and
   (D) recovering the cured article from the aqueous curing bath.

2. A process according to claim 1, wherein the shaped extrusion is moved through the aqueous curing bath by pulling at a rate equal to the rate at which the composition is extruded.

3. A process according to claim 1, wherein the shaped extrusion is moved through the aqueous curing bath by circulating the aqueous curing bath past the shaped extrusion at a rate slightly greater than the rate at which the composition is extruded.

4. A process according to claim 1, wherein the aqueous curing bath is maintained at a temperature equal to or greater than 50° C.

5. A process according to claim 1, wherein the shaped extrusion is moved through the aqueous curing bath by pulling at a rate equal to the rate at which the composition is extruded.

6. A process according to claim 1, wherein the shaped extrusion is moved through the aqueous curing bath by circulating the aqueous curing bath past the shaped extrusion at a rate slightly greater than the rate at which the composition is extruded.

7. A process for forming a cured article of consistent shape from a hydrolyzable siloxane composition of a liquid or paste viscosity, comprising:
   (A) extruding a non-self-supporting composition which is maintained at a temperature greater than 10° C. and which comprises a polydiorganosiloxane having at least two silicon-bonded hydrolyzable groups per molecule, a hydrolyzable silicon crosslinker, a filler, and optionally a curing catalyst, at a constant rate through a shaping die to form a shaped extrusion having a cross-sectional area that is substantially uniform throughout the length of the shaped extrusion;

(B) feeding the shaped extrusion in a continuous flow into a circulating aqueous curing bath maintained at a temperature of at least 20° C. and having a density substantially the same as or slightly greater than the density of the shaped extrusion;

(C) moving the shaped extrusion through the aqueous curing bath as the shaped extrusion cures into a cured article having a cross-sectional area that is substantially uniform throughout the length of the cured article; and (D) recovering the cured article from the aqueous curing bath.

8. A process for forming a cured article of consistent shape from a hydrolyzable siloxane composition of a liquid or paste viscosity, comprising:

(A) extruding a non-self-supporting composition which is maintained at a temperature greater than 5° C. and which comprises a hydroxyl-endblocked polydiorganosiloxane, a polyalkoxy-silicon crosslinker, a hexamethyldisilazane treated silica, a stearated calcium carbonate, and a curing catalyst, at a constant rate through a shaping die to form a shaped extrusion having a cross-sectional area that is substantially uniform throughout the length of the shaped extrusion;

(B) feeding the shaped extrusion in a continuous flow into an aqueous curing bath maintained at a temperature of at least 20° C. and having a density substantially the same as or slightly greater than the density of the shaped extrusion;

(C) moving the shaped extrusion through the aqueous curing bath as the shaped extrusion cures into a cured article having a cross-sectional area that is substantially uniform throughout the length of the cured article; and (D) recovering the cured article from the aqueous curing bath.

9. A process according to claim 8, wherein the hydrolyzable siloxane composition is formed from two premixed parts, the first part comprising a hydroxyl-endblocked polydiorganosiloxane, a hexamethyldisilazane treated silica, and a stearated calcium carbonate, and the second part comprising a polyalkoxy-silicon crosslinker, and a curing catalyst.

10. A process according to claim 8, wherein the hydroxyl-endblocked polydiorganosiloxane is hydroxyl-endblocked polydimethylsiloxane, the polyalkoxy-silicon crosslinker is tetra(n-propyl) ortho silicate, and the curing catalyst is a tin catalyst.

11. A process according to claim 10, wherein the hydrolyzable siloxane composition is formed from two pre-mixed parts, the first part comprising a hyodrxyl-endblocked polydimethylsiloxane, a hexamethyldisilazane treated silica, and a stearated calcium carbonate, and the second part comprising a tetra(n-propyl) ortho silicate and the tin catalyst.

12. A process for forming a cured article of consistent shape from a hydrolyzable siloxane composition of a liquid or paste viscosity, comprising:

(A) extruding a non-self-supporting composition which is maintained at a temperature greater than 5° C. and which is formed in two parts, the first part comprising a hydroxyl endblocked polydimethylsiloxane having a viscosity of 350 Pa.s, a hydroxyl-endblocked polydimethylsiloxane having a viscosity of 150 Pa.s, a trimethylsiloxy-endblocked polydimethylsiloxane having a viscosity of 0.1 Pa.s, a hydroxyl-endblocked polydimethylsiloxane having a silicon-bonded hydroxyl content of about 4.0 weight percent, a precipitated silica filler, having a surface treated with hexamethyldisilazane and an average particle size of about 0.3 micrometers and a surface area of about 125 m$^2$/g, a precipitated calcium carbonate treated with stearic acid having a surface area of about 22 m$^2$/g, and a ground calcium carbonate having an average particle size of 2–3 micrometers; and the second part comprising a tetra(n-propyl) ortho silicate, a trimethylsiloxy terminated polydimethylsiloxane having a viscosity of 1 Pa.s, a fumed silica filler, a dibutyltin diacetate, glacial acetic acid, and mineral spirits; at a constant rate through a shaping die to form a shaped extrusion having a cross-sectional area that is substantially uniform throughout the length of the shaped extrusion;

(B) feeding the shaped extrusion in a continuous flow into an aqueous curing bath maintained at a temperature of at least 20° C. and having a density substantially the same as or slightly greater than the density of the shaped extrusion;

(C) moving the shaped extrusion through the aqueous curing bath as the shaped extrusion cures into a cured article having a cross-sectional area that is substantially uniform throughout the length of the cured article; and (D) recovering the cured article from the aqueous curing bath.

13. A process for forming a cured article of consistent shape from a hydrolyzable siloxane composition of a liquid or paste viscosity, comprising:

(A) extruding a non-self-supporting composition which is maintained at a temperature greater than 10° C. and which comprises a hydroxyl-endblocked polydiorganosiloxane, a polyalkoxy-silicon crosslinker, a hexamethyldisilazane treated silica, a stearated calcium carbonate, and a curing catalyst, at a constant rate through a shaping die to form a shaped extrusion having a cross-sectional area that is substantially uniform throughout the length of the shaped extrusion;

(B) feeding the shaped extrusion in a continuous flow into a circulating aqueous curing bath maintained at a temperature of at least 20° C. and having a density substantially the same as or slightly greater than the density of the shaped extrusion;

(C) moving the shaped extrusion through the aqueous curing bath as the shaped extrusion cures into a cured article having a cross-sectional area that is substantially uniform throughout the length of the cured article; and (D) recovering the cured article from the aqueous curing bath.

* * * * *